(12) United States Patent
Rainville et al.

(10) Patent No.: US 7,473,480 B2
(45) Date of Patent: Jan. 6, 2009

(54) LOW VOLTAGE COMPRESSOR OPERATION FOR A FUEL CELL POWER SYSTEM

(75) Inventors: Joseph D Rainville, Caledonia, NY (US); John R Bonkoske, Lockport, NY (US); Victor W Logan, Naples, NY (US)

(73) Assignee: General Motors Corporation, Detroit, MI (US)

( * ) Notice: Subject to any disclaimer, the term of this patent is extended or adjusted under 35 U.S.C. 154(b) by 771 days.

(21) Appl. No.: 10/968,591

(22) Filed: Oct. 19, 2004

(65) Prior Publication Data
US 2006/0083965 A1   Apr. 20, 2006

(51) Int. Cl.
*H01M 8/04* (2006.01)
(52) U.S. Cl. ..................................... 429/23
(58) Field of Classification Search ............... 429/22, 429/23
See application file for complete search history.

(56) References Cited
U.S. PATENT DOCUMENTS
6,616,424 B2 * 9/2003 Raiser .................. 417/411
6,720,098 B2   4/2004 Raiser .................. 429/13

FOREIGN PATENT DOCUMENTS
DE    198 10 468        9/1999
DE    102004010536      9/2005
WO    WO99/54159        10/1999

OTHER PUBLICATIONS

Official Letter from the German Patent and Trademark Office dated May 2, 2007 for German Patent Application No. 10 2005 049 846.9, filed Oct. 18,2005; 10 Pages.

* cited by examiner

*Primary Examiner*—Patrick Ryan
*Assistant Examiner*—Thomas H. Parsons

(57) ABSTRACT

An apparatus and method for operating a fuel cell power system utilizing a low voltage power source and system power to power an airmover. The fuel cell power system uses a low voltage power source to power the airmover during start-up and transitions to using system power to power the airmover as the fuel cell stack increases its voltage output. During a shutdown operation the fuel cell power system transitions from using system power to using the low voltage power source to power the airmover enabling a purging operation to be performed. A controller coordinates the operation of the airmover between using the low voltage power source and using electrical power produced by the fuel cell stack to power the airmover.

31 Claims, 2 Drawing Sheets

LOW VOLTAGE COMPRESSOR OPERATION FOR A FUEL CELL POWER SYSTEM

FIELD OF THE INVENTION

The present invention relates to fuel cell power systems and, more particularly, to low voltage compressor start for a fuel cell power system.

BACKGROUND OF THE INVENTION

Fuel cells can be used as a power source in many applications. For example, fuel cells can be used in electrical vehicular power plants to replace internal combustion engines and in stationary applications to produce electrical power. In proton exchange membrane (PEM) type fuel cells, hydrogen is supplied to the anode of the fuel cell and oxygen is supplied to the cathode. PEM fuel cells include a membrane electrode assembly (MEA) comprising a thin, proton transmissive, non-electrically conductive solid polymer electrolyte membrane having the anode catalyst on one of its faces and the cathode catalyst on the opposite face. The MEA is sandwiched between a pair of electrically conductive elements that serve as current collectors for the anode and cathode. The conductive elements contain appropriate channels and/or openings therein for distributing the fuel cells' gaseous reactants over the surfaces of the respective anode and cathode catalysts. A typical PEM fuel cell and its MEA are described in U.S. Pat. Nos. 5,272,017 and 5,316,871 issued respectively Dec. 21, 1993 and May 31, 1994 and assigned to General Motors Corporation.

The term "fuel cell" is typically used to refer to either a single cell or a plurality of cells depending on the context. A plurality of individual cells are commonly bundled together to form a fuel cell stack. Each cell within the stack comprises the MEA described earlier. A group of adjacent cells within the stack is referred to as a cluster.

In PEM fuel cells, hydrogen ($H_2$) is the anode reactant (i.e., fuel) and oxygen is the cathode reactant (i.e., oxidant). The oxygen can be either a pure form ($O_2$) or air (a mixture of $O_2$ and $N_2$). The anode reactant is typically supplied to the fuel cell from a pressurized storage tank or from a fuel reformer. The cathode reactant can also be supplied to the fuel cell stack from a pressurized storage tank or can be drawn from the surrounding environment by use of an airmover.

The airmover typically consists of an electric motor and a compressor, either centrifical, mixed flow, blower or screw type. The airmover typically uses a high-voltage motor to drive the compressor. During normal operation of the fuel cell system, the high voltage power produced by fuel cell stack is used to drive the airmover and, thus, supply the fuel cell stack with the cathode reactant. During start-up of the fuel cell system, however, the fuel cell stack is not producing enough power and is unavailable to power the airmover. Furthermore, during a shutdown operation it may be desired to perform a purging operation using the airmover while the fuel cell stack is not producing sufficient power to power the airmover. Accordingly, there is a need to provide a power source to drive the airmover during start-up and/or shutdown of the fuel cell system.

In some fuel cell systems, a low voltage power supply, such as a 12-volt automotive battery, is available. Prior attempts to utilize the 12-volt battery for powering the airmover during start-up have used a separate low voltage motor, separate windings in an existing motor, or a 12-volt blower. These methods, however, have proven to be complex and/or result in the addition of extra components to the system that can add weight and/or take up valuable space.

SUMMARY OF THE INVENTION

The present invention provides an apparatus and method for starting up a fuel cell power system utilizing a low voltage power source to drive the airmover power control system which powers the airmover. The apparatus and method may also be used to switch operation of the fuel cell power system between using the low voltage power source and stack power to drive the airmover power control system and power the airmover. A fuel cell system according to the principles of the present invention include a fuel cell stack operable to produce electrical power using an anode reactant and a cathode reactant. There is an airmover that is operable to supply the cathode reactant to the fuel cell stack. There is also a low voltage power source which is operable to supply low voltage power. A controller system selectively powers the airmover using the low voltage power source and the power produced by the fuel cell stack. The controller system is operable to power the airmover at system idle with a same voltage and current value regardless of using the low voltage power and the stack power.

A method of operating a fuel cell system according to the principles of the present invention is also disclosed. The method includes (1) operating the fuel cell system in a first mode by using the low voltage power source to drive the power control system and power the airmover with a predetermined voltage and current and supply the cathode reactant to the fuel cell stack; (2) operating the fuel cell system in a second mode when the fuel cell stack is producing sufficient power by using power produced by the fuel cell stack to drive the power control system and power the airmover and supply the cathode reactant to the fuel cell stack; and (3) transitioning between (a) and (b) based upon a voltage output of the fuel cell stack with the power control system which is operable to power the airmover at system idle with a same voltage and current value regardless of the fuel cell system operating in said first mode and said second mode.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses. As used herein, the term module refers to an application specific integrated circuit (ASIC), an electronic circuit, a processor (shared, dedicated or group) and memory that execute one or more software or firmware programs, a combinational logic circuit, or other suitable components that provide the described functionality.

Figure 1:
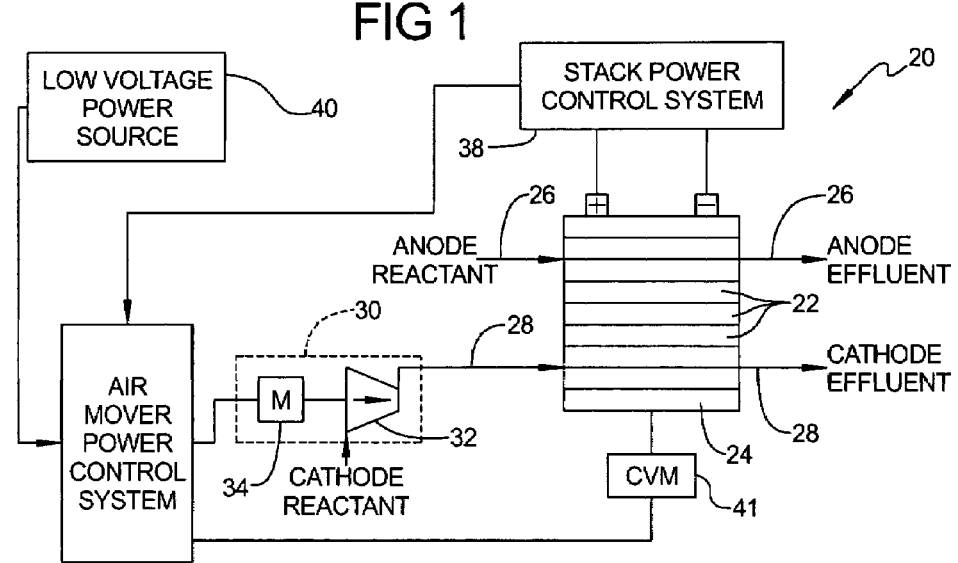
FIG. 1 is a schematic representation of a fuel cell system according to the principles of the present invention.

Referring now to FIG. 1, a fuel cell system 20 according to the principles of the present invention is shown. Fuel cell system 20 includes a plurality of fuel cells 22 arranged in a stacked configuration to form a fuel cell stack 24. Fuel cell stack 24 has an anode reactant flow path 26 and a cathode reactant flow path 28 that are used to provide the respective anode and cathode reactants to fuel cell stack 24. Each flow path 26, 28 includes the internal flow paths within each fuel cell 22 within fuel cell stack 24 along with the plumbing used to supply and remove the respective anode and cathode reactants to and from the appropriate flow paths within fuel cell stack 24.

Anode reactant flow path 26 receives a hydrogen-containing anode reactant stream while cathode reactant flow path 28 receives an oxygen-containing cathode reactant stream from an airmover 30. Each fuel cell 22 within stack 24 is operable to convert the anode and cathode reactants into electricity, a hydrogen-containing anode effluent and an oxygen-containing cathode effluent.

The hydrogen-containing anode reactant can be provided from a variety of sources. Such sources include, but are not limited to, a reformate stream from a reformer and a hydrogen stream from a hydrogen storage device. The cathode reactant is provided by airmover 30 and is drawn from the environment within which fuel cell system 20 is employed. The anode reactant supplied to the fuel cells in the fuel cell stack and the venting of the anode effluent produced in the fuel cell stack will not be discussed in detail. Additionally, the venting of the cathode effluent produced in the fuel stack will also not be discussed in detail. It should be understood that anode reactant will be supplied to the various fuel cells in a quantity sufficient to meet the operational demands of fuel cell system 20 and that the anode and cathode effluents will be removed from fuel cell stack 24 as needed.

Airmover 30 includes a compressor 32 and an electric motor 34. Electric motor 34 drives compressor 32 to draw air from the environment and provide the cathode reactant to fuel cell stack 24 as commanded by an airmover power control system 36. Compressor 32 can take a variety of forms. Such forms include, but are not limited to, centrifical, mixed flow, blower, and screw type compressor. Airmover power control system 36 includes the components traditionally used to power airmover 30 along with the addition of low voltage hardware to drive airmover 30 in a desired manner using a low voltage power source, as discussed in more detail below.

Airmover power control system 36 normally uses fuel cell stack generated power via stack power control system 38 to drive airmover 30. During start-up and/or during shutdown, however, airmover power control system 36 uses power from a low voltage power source 40 to drive airmover 30, as discussed in more detail below.

Low voltage power source 40 can take a variety of forms, such as a battery or other electrochemical storage devices or a capacitor, such as an ultra capacitor. Preferably, low voltage power source 40 is a nominally 12-volt battery, such as an automotive type battery. If desired, however, low voltage power source 40 can be a battery of a different voltage. As used herein, the term low voltage refers to a nominal voltage of up to about 50 volts or less than the rated stack or system voltage.

A cell voltage monitor (CVM) 41 communicates with fuel cell stack 24 and airmover power control system 36. CVM 41 is operable to monitor the voltage production of the individual fuel cells 22, groups of fuel cells and/or that of fuel cell stack 24. CVM 41 is operable to provide these voltage output measurements to airmover power control system 36 to be used in controlling the operation of airmover 30, as described in more detail below. Alternately, airmover power control system 36 can monitor stack voltage through the stack power control system 38.

Figure 2:
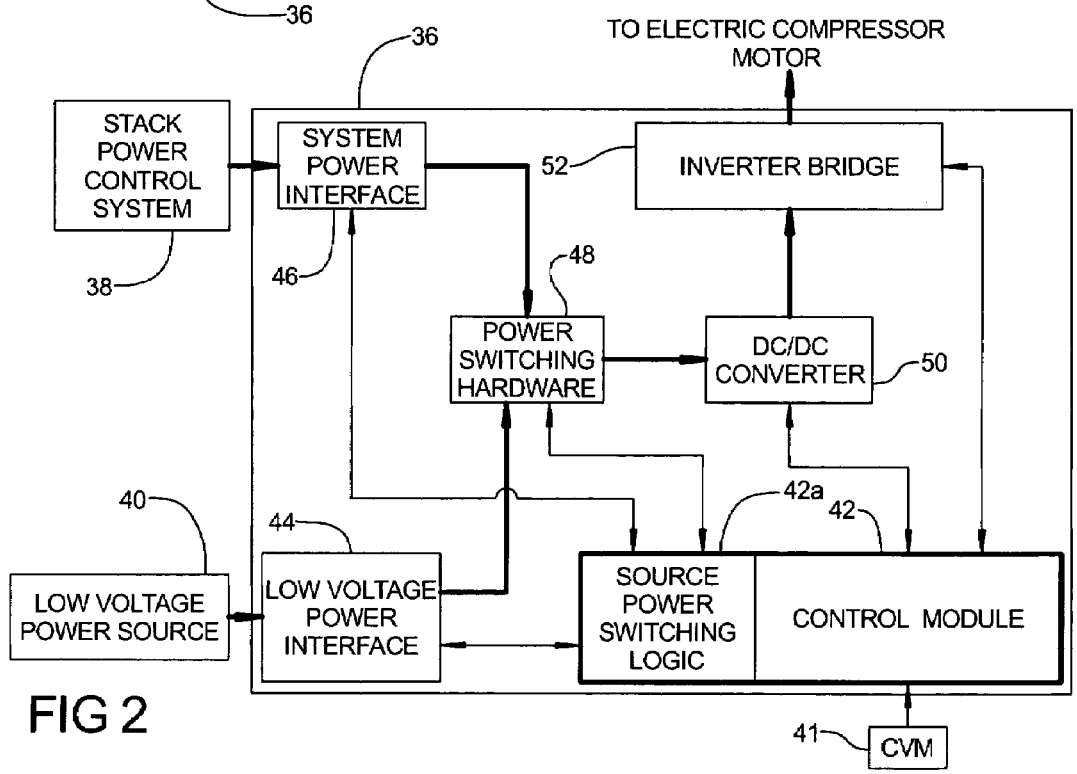
FIG. 2 is a schematic representation of the control module used in the fuel cell system of FIG. 1.

Referring now to FIG. 2, the details of airmover power control system 36 are schematically represented. Airmover power control system 36 includes a control module 42 that communicates with and controls the operation of the various components of airmover power control system 36 and coordinates their operation to drive airmover 30 as needed. Airmover power control system 36 includes a low voltage power interface 44 that is connected to low voltage power source 40 and a system power interface 46 that receives fuel cell stack generated power from stack power control system 38.

Low voltage power interface 44 and system power interface 46 both communicate with power switching hardware 48. Power switching hardware 48 is operable to switch between using power supplied via low voltage power interface 44 and power provided via system power interface 46 to drive airmover 30. Control module 42 communicates with both low voltage and system power interfaces 44, 46, power switching hardware 48, DC/DC converter 50 and inverter bridge 52 to control the selection of which power source is used to drive airmover 30 and to control and coordinate the transitioning between using one power source and the other.

Control module 42 contains source power switching logic 42a and software to provide a sliding mode algorithm to coordinate the switching between using low voltage power source 40 and stack power from stack power control system 38 to drive airmover 30. The sliding mode algorithm provides seamless transition from using low voltage power to stack power without interrupting the operation of airmover 30. This is accomplished by a single software program that adjusts power switching hardware 48 (adjust active and/or passive switches on and off) to change power sources and adjusts operation of DC/DC converter 50 and bridge 52 to accommodate the different power source. Both power sources are not disconnected or isolated at the same time and operation of airmover 30 is essentially not interrupted.

Electrical power flows from power switching hardware 48 to DC/DC converter 50. DC/DC converter 50 is operable to convert the DC current and voltage flowing from power switching hardware 48 into a desired DC current at a desired high voltage level to be used to drive airmover 30. For example, DC/DC converter can convert 12 Vdc (from a low voltage power source) to 300 Vdc and can convert 400 Vdc (from a high voltage power source) to 300 Vdc. A same current value at system idle can be achieved regardless of converting power from the high or low voltage power source. Electrical power flows from DC/DC converter 50 to inverter bridge 52. Inverter bridge 52 transforms the DC power into a desired three-phase AC wave form having a variable frequency and pulse width to drive airmover 30. For example, bridge 52 can transform 300 Vdc from DC/DC converter 50 to 0-220 Vrms, at a frequency of 0 Hz to the base frequency of the motor, using any variety of pulse width modulation schemes. Compressor 32 thereby provides cathode reactant to fuel cell stack 24 via cathode reactant flow path 28. Control module 42 also communicates with DC/DC converter 50 and inverter bridge 52 to control and coordinate the entire operation of all the components of airmover power control system 36.

Figure 3:
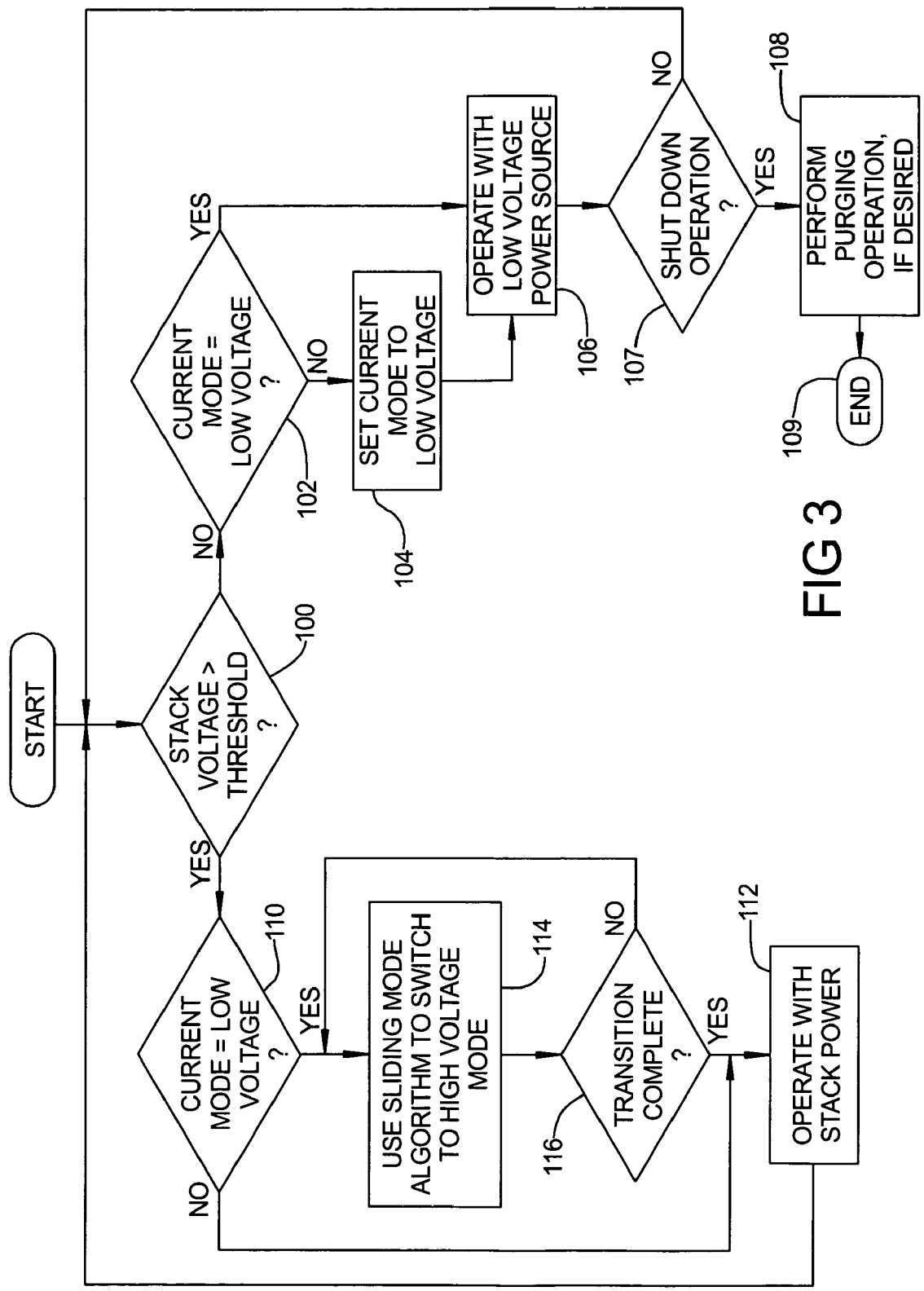
FIG. 3 is a flow chart of the start-up process according to the principles of the present invention for the fuel cell system of FIG. 1.

To operate fuel cell system 20, initiation of the reactions within fuel cell stack 24 are commenced via operating fuel cell stack 24 in a start-up mode. During a shutdown operation, the reactions within fuel cell stack 24 are already occurring. Referring to FIG. 3, operation, including start-up and shutdown, of fuel cell system 20 is shown. During operation, the power output of fuel cell stack 24 is compared to a threshold value (e.g., power sufficient to operate fuel cell system 20 at idle), as indicated in decision block 100. If the stack voltage output is less than the threshold voltage, the current operating mode (i.e., high or low voltage power source operation) is checked, as indicated in decision block 102. If the current operating mode is not the low voltage mode, the operating mode is switched to the low voltage mode, as indicated in block 104, so that low voltage power source 40 (e.g., a nominal 12 Vdc power source) can be used to drive the airmover power control system 36 and power airmover 30.

To switch to the low voltage mode, control module 42, via appropriate switching and regulation algorithms, commands switching hardware 48 to use low voltage power source 48 to drive airmover 30. Power switching hardware 48 blocks system power interface 46 via either active or passive means. Switching hardware 48 establishes an electrical connection between DC/DC converter 50 and low voltage power interface 44.

With fuel cell system 20 in the low voltage mode, operation of fuel cell stack 24 using power from low voltage power source 40 commences, as indicated in block 106. Low voltage power interface 44 filters and conditions the low voltage power, as needed, prior to flowing to DC/DC converter 50. Converter 50 and bridge 52, pursuant to instructions and regulation algorithms from control module 42, converts the current and voltage from low voltage power source 40 to the appropriate current and high voltage level to drive airmover 30.

Preferably, DC/DC converter 50 and bridge 52 are controlled to provide a sinusoidal current of a desired substantially fixed magnitude (e.g., 80 amps) to airmover 30. The sinusoidal current causes a torque vector to be applied to compressor 32 by motor 34. The magnitude of the sinusoidal current is chosen to provide a desired rotational speed (RPM) of compressor 32. Preferably, compressor 32 is operated at a substantially fixed RPM during start-up and shutdown. Additionally, airmover 30, during start-up and shutdown, is preferably operated to use minimum power (e.g., 0.5 kW) to provide a net zero idle condition for fuel cell system 20.

Along with providing cathode reactant to fuel cell stack 24, fuel cell system 20 during start-up and normal operation is concurrently operated to cause anode reactant to flow into fuel cell stack 24 via anode reactant flow path 26. This allows fuel cell stack 24 to begin operation and/or produce a useable high voltage potential on its output terminals (e.g., in the range of 200 Vdc to 500 Vdc). During shutdown, anode reactant flow into fuel cell stack 24 is stopped.

With fuel cell system 20 being operated in the low voltage mode, a determination of whether the operation is part of a shutdown operation is ascertained, as indicated in decision block 107. If a shutdown operation is occurring, as indicated in block 108, a purging operation, if desired, is performed on fuel cell system 20. Once the purging operation has been completed, operation of fuel cell system 20 can end, as indicated in block 109.

If a shutdown operation is not occurring, control module 42 monitors the voltage production of fuel cell stack 24 via its communication with CVM 41, as indicated in decision block 107. If the stack voltage is still below the threshold value, airmover power control system 36 continues to cause airmover 30 to be driven by low voltage power source 40 as fuel cell stack 24 continues to rise in voltage. The voltage output of fuel cell stack 24 will continue to increase until it reaches its threshold value, such as its idle point wherein the power produced by fuel cell stack 24 is sufficient to operate fuel cell system 20 without the use of additional power input from low voltage power source 40. The idle point thus corresponds to the net power of fuel cell system 20 being equal to or greater than zero.

When fuel cell stack 24 produces voltage in excess of the threshold value airmover power control system 36 will initiate a seamless power supply switchover from using low voltage power source 40 to using system power 38 to drive airmover 30, as indicated in decision block 100. To do this, the current operating mode is checked, as indicated in decision block 110. If the current mode is already set to high voltage, fuel cell system 20 will be operated using stack power, as indicated in block 112. If the current mode is the low voltage mode, however, control module 42 will implement a sliding mode algorithm to transition from low voltage mode to high voltage mode, as indicated in block 114.

To switch from the low voltage mode to the high voltage mode, control module 42 commands, via source power switching logic 42a, power switching hardware 48 to block low voltage power interface 44 via either active or passive means and allow system power interface 46 to provide stack power to DC/DC converter 50. Control module 42 adjusts the present (start-up) switching method sent to DC/DC controller 50 and bridge 52 to accommodate the higher source voltage and still maintain the required commanded speed and power for airmover 30. This is accomplished by software contained within control module 42 including a sliding mode algorithm to provide a "bump less" source power transition and essentially not interrupt compressor motor 34 rotation such that a user of fuel cell system 20 is unaware of the transition. Airmover 30 will still preferably be operating at a minimum power level at the instant of the voltage source transition.

The status of the transition from low voltage mode to high voltage mode is checked, as indicated in decision block 116. If the transition is not complete, the transition process continues. When the transition is complete, airmover 30 is driven entirely with stack power via stack power control system 38, as indicated in block 112. Once airmover 30 is being driven entirely by stack power, fuel cell system 20 is in a normal operating mode and no longer in a start-up mode. Accordingly, the start-up operation of fuel cell system 20 ends.

During normal operation control module 42 continues to monitor the voltage production of fuel cell stack 24 via its communication with CVM 41. Source power switching logic 42a, low voltage power interface 44, system power interface 46 and power switching hardware 48 remain static in their present states. Control module 42 makes required changes in switching commands to DC/DC converter 50 and bridge 52 in order to maintain the commanded airmover 30 speed and power as dictated by the power demand placed on fuel cell system 20. With fuel cell system 20 operating in the normal mode, low voltage power source 40 is no longer needed to drive airmover 30. As such, low voltage power source 40 can remain unused or be recharged using stack power during normal operation of fuel cell system 20. When stack voltage falls below the threshold value, as indicated in block 100, the switchover to operation in the low voltage mode is again commenced, as described above.

It should be appreciated that the transitioning between using low voltage power source 40 and stack power to drive airmover 30 can be done in a number of manners and does not necessarily require the net power production to be equal to or greater than zero. For example, while the net power production is still negative, a transition from using low voltage power source 40 to using stack power to drive airmover 30 can commence, although the low voltage power source may then be required to supply power to other components of fuel cell system 20. The time for commencing and transitioning the operation will depend upon the desired operation of fuel cell system 20 and the design of the components utilized therein. Additionally, the threshold value can vary based on whether fuel cell system 20 is being operated in a start-up mode or a shutdown mode. The threshold values will be set to achieve a desired start-up operation and shutdown operation of fuel cell system 20. Accordingly, these threshold values may be the same or may differ for these different modes of operation.

Thus, the fuel cell system 20 according to the principle of the present invention can utilize an existing compressor control module with minimal modifications and additions to drive airmover 30 from either a low voltage power source 40 or stack power. This is easily achieved by adding low voltage power interface 44, power switching hardware 48 and a source power switching logic 42a and additional or modified software to the traditional airmover power control system. The resulting airmover power control system 36 can then be utilized to drive airmover 30 via low voltage power source 40 during a start-up mode and transition to using stack power to drive airmover 30 once fuel cell stack 24 is producing sufficient voltage.

It should be appreciated that changes and alterations to fuel cell system 20 and the components therein can be employed without departing from the spirit and scope of the present invention. For example, airmover power control system 36, instead of being a stand alone system, can be integrated into the system power electronics (not shown) used to coordinate the entire operation of fuel cell system 20. Thus, the description of the invention is merely exemplary in nature and variations that do not depart from the gist of the invention are intended to be within the scope of the invention. Such variations are not to be regarded as a departure from the spirit and scope of the invention.

What is claimed is:

1. A fuel cell system comprising:
    a fuel cell stack that produces stack power when supplied with an anode reactant and a cathode reactant;
    an airmover that supplies said cathode reactant to said fuel cell stack;
    a low voltage power source that supplies low voltage power;
    a controller system that selectively powers said airmover using said low voltage power source and said stack power; and
    a source power switch coupled to said fuel cell stack and said low voltage power source,
    wherein said controller system is operable to power said airmover with a same voltage and current value regardless of using said low voltage power and said stack power; and
    wherein said controller system operates in a sliding mode when transitioning power between said low voltage power source and said fuel cell stack without interrupting power to and while maintaining a speed of said airmover.

2. The fuel cell system of claim 1, wherein said low voltage power source includes a battery.

3. The fuel cell system of claim 2, wherein said controller system includes a direct current (DC)/DC converter operable to convert said low voltage power and said stack power to a same voltage and current value.

4. The fuel cell system of claim 1, wherein said controller system causes a desired current to be sent to said airmover.

5. The fuel cell system of claim 1, wherein said controller system includes a control module that employs an algorithm to smoothly transition between using power from said low power supply to using power produced by said fuel cell stack to drive said airmover via said source power switch, and
    wherein during said transition, power is supplied by both said low power supply and said fuel cell stack at the same time.

6. The fuel cell system of claim 1, wherein said controller system includes a low voltage power interface, a fuel cell system power interface, and source power switch operable to switch between using power from said low voltage power interface and power from said fuel cell system power interface to drive said airmover.

7. The fuel cell system of claim 1, wherein said airmover is a compressor.

8. The fuel cell system of claim 1, wherein said airmover operates at a substantially constant rpm when being driven by said low voltage power source.

9. The fuel cell system of claim 1, wherein said controller system:
    (a) operates in a start-up mode that includes driving the airmover with the low voltage power source, which has a predetermined voltage and current, and supplies the cathode reactant to the fuel cell stack;
    (b) operates in a normal mode that includes driving the airmover with the fuel cell stack and supplies the cathode reactant to the fuel cell stack; and
    (c) transitions from (a) to (b) when a voltage output of the fuel cell stack exceeds a predetermined threshold value 10. The fuel cell system of claim 9, wherein said controller system comprises a control module that implements a sliding mode algorithm to smoothly transition from (a) to (b) without interrupting power to said airmover and while maintaining a speed of said airmover.

11. The fuel cell system of claim 10, wherein said controller system comprises a source power switch and smoothly transition from (a) to (b) via said source power switch.

12. The fuel cell system of claim 9, wherein said controller system transitions from (b) to (a) when said voltage output is less than a predetermined threshold value.

13. The fuel cell system of claim 12, wherein the controller system performs a purging operation on the fuel cell system with the airmover after transitioning from (b) to (a).

14. The fuel cell system of claim 9, wherein the controller system monitors a net power production of the fuel cell system and transitions from (a) to (b) once the net power production is equal to or greater than zero.

15. The fuel cell system of claim 9, wherein the controller system during (a) operates the airmover at a substantially fixed rpm.

16. The fuel cell system of claim 9, wherein the controller system during (a) supplies a predetermined current to the airmover.

17. The fuel cell system of claim 1, wherein the controller system:
    (a) ascertains said stack power;
    (b) compares said stack power to a predetermined threshold;
    (c) operates the airmover using power from one of the low voltage power source and the fuel cell stack depending upon said comparison.

18. The fuel cell system of claim 17, wherein the controller system supplies a high voltage to the airmover regardless of using power from the low voltage power source and the fuel cell stack.

19. The fuel cell system of claim 17, wherein the controller system repeatedly performs (a) through (c) until said stack power output exceeds said predetermined threshold.

20. The fuel cell system of claim 17, wherein the controller system operates the airmover using power from the fuel cell stack when said stack power output exceeds said predetermined threshold.

21. The fuel cell system of claim 17, wherein the controller system checks a current operating mode of the fuel cell system when said stack power output exceeds said predetermined threshold,
wherein the controller system transitions to a high voltage mode when the fuel cell system is currently operating in a low voltage mode, and
wherein the controller system drives the airmover using power from the fuel cell stack when said transition is complete.

22. The fuel cell system of claim 21, wherein the controller system transitions to said high voltage mode based on an algorithm.

23. The fuel cell system of claim 17, wherein the controller system drives the airmover using power from the low voltage power source when said stack power is equal to or less than said predetermined threshold value.

24. The fuel cell system of claim 23, wherein the controller system operates the airmover at a substantially fixed rpm when using power from the low voltage power source.

25. The fuel cell system of claim 17, wherein the controller system checks a current operating mode of the fuel cell system when said stack power output is equal to or less than said predetermined threshold, and
wherein the controller system sets said operating mode to a low voltage mode when the fuel cell system based on said check.

26. The fuel cell system of claim 1 wherein the controller system comprises:
a power switch operable to selectively output one of a first direct current (DC) voltage from the fuel cell stack and a second DC voltage from the low voltage power source;
a DC/DC converter that selectively converts at least one of said first and second DC voltages to a third DC voltage, said third DC voltage being a high voltage; and
an inverter that transforms said third DC voltage into a three-phase alternating current (AC) wave form and outputs said three-phase AC wave form to the airmover.

27. The fuel cell system of claim 26, further comprising a control module that communicates with and controls the operation of said power switch, said DC/DC converter and said inverter.

28. The fuel cell system of claim 26, wherein said second DC voltage is nominally 12 volts.

29. The fuel cell system of claim 26, further comprising a control module and wherein said control module uses an algorithm to cause said power switch to transition from outputting said second DC voltage to outputting said first DC voltage.

30. The fuel cell system of claim 26, wherein a substantially constant current is outputted to the airmover when said power switch is outputting said second DC voltage.

31. A fuel cell system comprising:
a fuel cell stack that produces a first direct current (DC) voltage when supplied with an anode reactant and a cathode reactant;
an airmover that supplies said cathode reactant to said fuel cell stack;
a low voltage power source that supplies a second DC voltage; and
a power switch that receives said first and second DC voltages and selects one of said first and second DC voltages;
a DC/DC converter that selectively converts at least one of said first and second DC voltages to a third DC voltage, said third DC voltage being a higher voltage than said first and second DC voltages; and
an inverter that transforms said third DC voltage into a three-phase alternating current (AC) wave form and outputs said three-phase AC wave form to the airmover.

* * * * *